United States Patent
Rodriguez et al.

(10) Patent No.: US 7,853,221 B2
(45) Date of Patent: Dec. 14, 2010

(54) NETWORK BRIDGE DEVICE AND METHODS FOR PROGRAMMING AND USING THE SAME

(75) Inventors: Yan Rodriguez, Suwanee, GA (US); Ben L. Garcia, Conyers, GA (US)

(73) Assignee: HomeRun Holdings Corp., North Canton, OH (US)

( * ) Notice: Subject to any disclaimer, the term of this patent is extended or adjusted under 35 U.S.C. 154(b) by 1797 days.

(21) Appl. No.: 10/988,078

(22) Filed: Nov. 12, 2004

(65) Prior Publication Data

US 2006/0104291 A1    May 18, 2006

(51) Int. Cl.
*H04B 1/40* (2006.01)
*H04M 1/00* (2006.01)

(52) U.S. Cl. ............... 455/74; 455/74.1; 455/554.1; 455/556.1

(58) Field of Classification Search ........... 455/41.2, 455/41.3, 66.1, 554.1, 554.2, 556.1, 557, 455/74, 74.1
See application file for complete search history.

(56) References Cited

U.S. PATENT DOCUMENTS

| | | | | |
|---|---|---|---|---|
| 6,120,262 | A | 9/2000 | McDonough et al. | 417/424.1 |
| 6,155,160 | A | 12/2000 | Hochbrueckner | 99/331 |
| 6,243,000 | B1 | 6/2001 | Tsui | 340/5.21 |
| 6,324,402 | B1 * | 11/2001 | Waugh et al. | 455/445 |
| 6,331,814 | B1 | 12/2001 | Albanl et al. | 340/310.01 |
| 6,481,013 | B1 | 11/2002 | Dinwiddie et al. | 725/80 |
| 6,807,463 | B1 | 10/2004 | Cunningham et al. | 700/304 |
| 6,985,461 | B2 * | 1/2006 | Singh | 370/329 |
| 7,209,840 | B2 * | 4/2007 | Petite et al. | 702/62 |
| 7,227,529 | B2 * | 6/2007 | Suomela | 345/156 |
| 2002/0027504 | A1 * | 3/2002 | Davis et al. | 340/540 |
| 2003/0062990 | A1 | 4/2003 | Schaeffer, Jr. et al. | 340/310.01 |
| 2003/0112810 | A1 * | 6/2003 | Nakabayashi et al. | 370/401 |
| 2003/0224728 | A1 | 12/2003 | Heinonen et al. | 455/41.2 |
| 2004/0058706 | A1 * | 3/2004 | Williamson et al. | 455/557 |
| 2004/0198251 | A1 | 10/2004 | Fitzgibbon | 455/91 |
| 2004/0239496 | A1 | 12/2004 | Fitzgibbon | 340/539.1 |
| 2005/0272372 | A1 * | 12/2005 | Rodriguez | 455/66.1 |
| 2006/0187034 | A1 | 8/2006 | Styers et al. | 340/545.1 |
| 2007/0197262 | A1 * | 8/2007 | Smith et al. | 455/562.1 |
| 2008/0211663 | A1 * | 9/2008 | Mansfield et al. | 340/538 |
| 2009/0036159 | A1 * | 2/2009 | Chen | 455/556.1 |

* cited by examiner

*Primary Examiner*—Andrew Wendell
(74) *Attorney, Agent, or Firm*—Renner Kenner Greive Bobak Taylor & Weber

(57) ABSTRACT

A network bridge device that links a wireless network and a wired network to one another. The bridge includes a wireless signal transceiver adapted to receive and send signals in a wireless format, and a wired signal transceiver adapted to receive and send signals in a wired format. A bridge controller is connected to both transceivers and converts the wireless signals from the first format to the second format and the wired signals from the second format to the first format. The bridge may also be configured to communicate with a wireless network control device and/or a wired network control device.

10 Claims, 8 Drawing Sheets

NETWORK BRIDGE DEVICE AND METHODS FOR PROGRAMMING AND USING THE SAME

TECHNICAL FIELD

The present invention generally relates to home networks. In particular, the present invention relates to a bridge device for use in a home network that allows for communications between wireless and wired devices. Specifically, the present invention relates to a network bridge device that enables translation and cross-transmission of traffic generated by devices on a power line network and on a radio frequency network, effectively allowing both types of network devices to communicate with one another.

BACKGROUND ART

The home networking field has been increasing in popularity the last few years. The "digital home," as referred to by industry insiders, will supposedly enable consumers to network and interface various types of appliances and devices throughout the home. For example, it is believed that the network will allow linking of such home appliances as alarm clocks, stereo equipment, televisions and kitchen appliances. For example, after an alarm clock has sounded and the network detects activity in the bathroom in the morning, then the network can alert the coffee maker in the kitchen to begin preparation of a pot of coffee. Or, the bathroom scale can be continually monitored and provide input data upon each weighing to exercise software on a home computer linked to home exercise equipment.

Manufacturers from a wide variety of industries have been developing "networked" products to meet this emerging market. Due to lack of industry standards, manufacturers have engaged in developing their own proprietary network protocols and hardware in order to connect devices. As a response to the network incompatibility issue, some industry groups have been formed in order to create "standards" so that manufacturers following these standards are able to create compatible devices adhering to a specific protocol in software and hardware.

Groups such as WI-FI, which adhere to the 802.11x IEEE standards, are producing products today to allow fast connection between computer and multi-media systems. This particular standard is designed for transferring a large amount of data across a wireless network. Other groups such as the "Powerlin" group have developed fast data transfer networks using the existing home electrical wiring. Yet other groups have formed standards such as HomeRF.

When fast data rates are required, the aforementioned standards work very well. However, in cases where simple control signals such as "on\off" and status are required, a fast data network becomes "overkill" for these simple applications. Manufacturers requiring a simpler type of network for control applications have developed standards such as "Zigbee" and "Z-wave" in an effort to keep their overall systems price competitive. These "control" networks add yet another level of complexity to the home integrator whose job is to make all of these systems work together seamlessly. In addition, different standards are being developed which presumably link the internet and cell phone communications systems with the home network. It is also believed that the home network may be extended into devices maintained in the garage or barriers that are accessible by an operator controlling the barrier, but the communication standards utilized by the garage door operator and the home network are not at all compatible.

Since the goal of the home network is to connect all devices together and to offer consumers easy-to-use interfaces, it is necessary to develop interfaces capable of "bridging" devices utilizing incompatible communication protocols. One type of "power line" network utilizes the X-10 standard. This scheme uses existing infrastructure wiring to enable devices to communicate with one another. However, one of the most expensive components in a traditional wired network is the cost of the wire itself, and the cost of each point drop or node needed to access the wired network. Power line networking uses existing electrical wiring to create a network to serve both computers and other electronic devices. Since most locations have plenty of power outlets, the proponents of the X-10 standard suggest the technology will be easier and eventually less expensive to implement than other wired types of networking. Indeed, various home automation systems have been designed for the remote control of lights and appliances centered about the standard electrical wiring already in existence in a facility. Additionally, adapters from companies have been developed to use power lines to carry phone signals to rooms without phone jacks. Other products have been introduced to allow for digital data transfer over power lines for computers and internet devices.

There are two established methods that are used to send and receive data over existing power lines. The first is Orthogonal Frequency-Division Multiplexing (OFDM) with forward error-correction. This scheme is very similar to the technology found in DSL modems. OFDM is a variation of the frequency-division multiplexing (FDM) used in phone-line networking. FDM puts computer data on separate frequencies from the voice signals being carried by the phone line and separates the extra signal space into distinct data channels by splitting it into uniform chunks of bandwidth. In the case of OFDM, the available range of frequencies on the electrical subsystem (4.3 MHz to 20.9 MHz) is split into 84 separate carriers. OFDM sends packets of data simultaneously along several of the carrier frequencies allowing for increased speed and reliability. If electrical noise or a surge in power usage disrupts one of the frequencies, control circuitry used as part of the multiplexing system senses the change and switches that data to another carrier. This rate-adaptive design allows the control circuitry to maintain an Ethernet-class connection throughout the power-line network without losing valuable data.

The other method of sending and receiving data over a power line relies on frequency-shift keying (FSK) to send data back and forth over existing wiring. FSK uses two frequencies, one for the 1s and another for the 0s, to send digital information between the computers on the network. The frequencies used are in a narrow band just above the level where most line noise occurs. Although this method works, it has been found to be somewhat fragile. Anything that interferes on either frequency can disrupt the data flow and can cause the transmitting computer to have to resend the data and thus reduces the performance of the network.

One drawback of the power-line networks is that they are designed to work on 110-volt electrical systems and as such, the technology is not very useful in countries outside of North America that use different standards.

It is also known to use a radio frequency (RF) network so as to avoid the necessity of wires. Such a network allows for devices to access the network in the same way that one listens to a radio from almost anywhere. Radio frequency networks are also referred to as Wireless Local Area Networks (WLAN) which function by using electromagnetic waves to communicate between devices connected to the network. Such radio frequency networks are widely used in the United States and other countries and are advantageous inasmuch as they: permit mobility of the user; can be deployed where cabling would otherwise be very difficult; and are cost effective when compared to wired networks. Moreover, several established standards allow for interoperability of devices over radio frequency networks. Standards like IEEE 802.11, BlueTooth, and cellular networks are all established and widely adopted. There are also other emerging standards including IEEE 802.15.4, namely the ZigBee standard and other derivatives like Z-Wave which target both lower band width network requirements. These lower band widths require much less power and are ideally suited for battery-operated applications.

The aforementioned wired and wireless networks employ an event controller which has stored internally, knowledge of external devices, and knowledge of how to communicate with each external device. Simple examples of an event controller are TV remote controls or garage door opener transmitters. In both examples, the respective controller has knowledge of how to control the target device, that is, the television or the garage door. In more elaborate implementations, an event controller has stored knowledge of a plurality of external devices and is capable of communicating with the devices either independently or collectively. An example of a collective communication is when an ALL-ON or ALL-OFF command from an X-10 power line controller to all the power line modules collectively controls them either to the on or off position.

Although the network scenarios described above are effective in their stated purpose, it will be appreciated that the various scenarios are unable to communicate effectively with one another. Therefore, there is a need in the art to be able to integrate the power line and radio frequency networks by use of a bridging device which embodies both types of hardware and protocols needed to interface with each. Such a device would allow for the local control of either type of network device via a built-in interface that can be taught, configured and re-configured to communicate between both types of networks and their respective devices.

SUMMARY OF THE INVENTION

Therefore, there is a need in the art for a network bridge device and methods for programming and using the same.

Another aspect of the present invention which shall become apparent as the detailed description proceeds, is achieved by a bridge device linking a wired network and a wireless network, comprising: a wireless signal transceiver adapted to receive and send wireless signals in a first format; a wired signal transceiver adapted to receive and send wired signals in a second format; and a bridge controller connected to said wireless signal transceiver and said wired signal transceiver, said bridge controller converting said wireless signals from said first format to said second format and said wired signals from said second format to said first format.

Still another aspect of the present invention is achieved by a network bridge device linking devices on a wired network to devices on a wireless network, comprising a wireless signal transceiver adapted to send and receive wireless signals; a wireless signal transceiver adapted to send and receive wired signals; and a bridge controller programmed to receive operational signals from the wireless signal transceiver and the wired signal transceiver, convert the operational signals from one format to another format, and send operational signals in the converted formats to the wired signal transceiver and the wireless signal transceiver.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
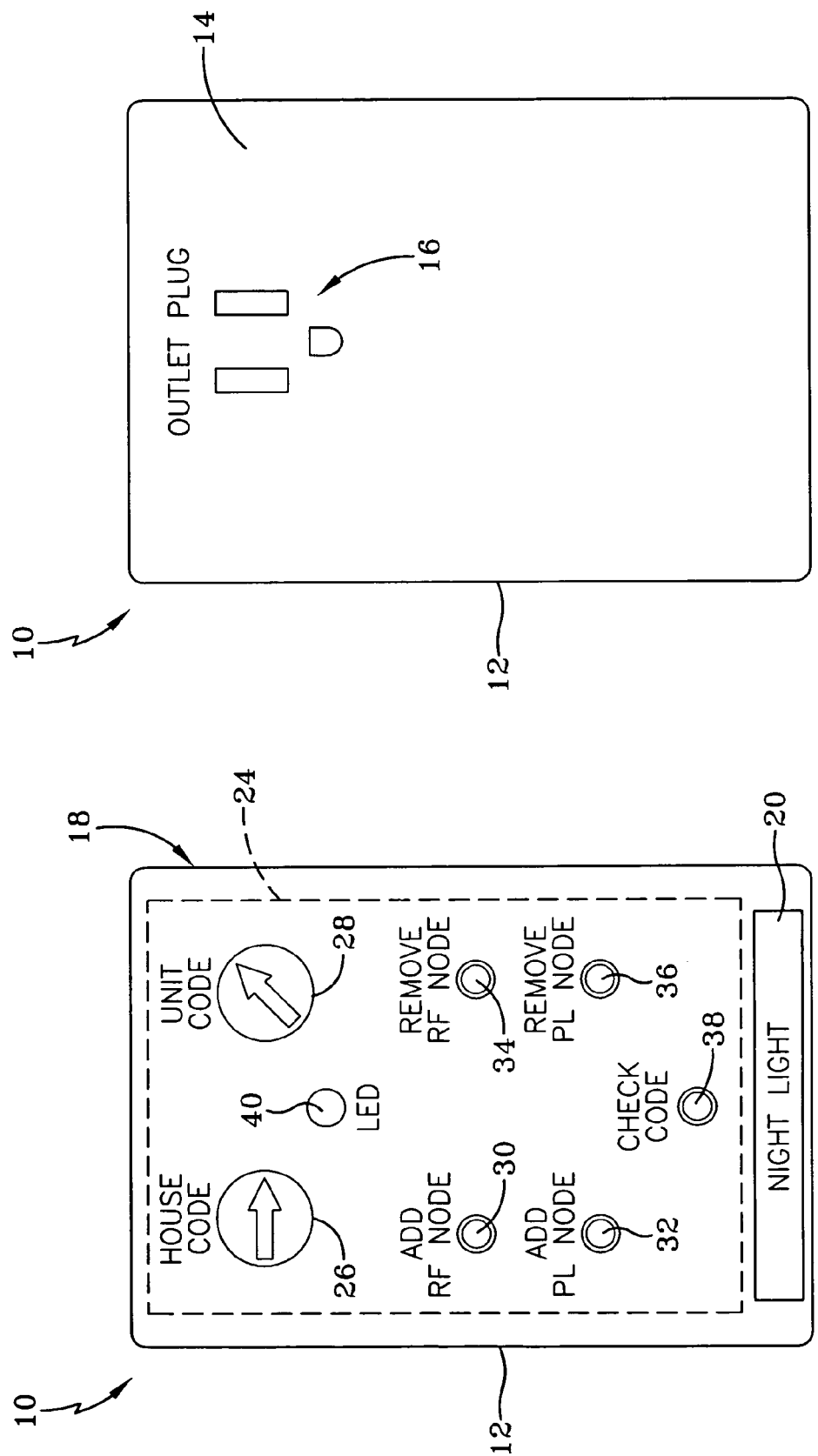
FIGS. 1A and 1B are front and back elevational views, respectively, of a bridge device made in accordance with the concepts of the present invention.

Referring now to the drawings and, in particular, to FIGS. 1A and 1B, it can be seen that a bridge device made in accordance with the concepts of the present invention is designated generally by the numeral 10. The bridge 10, which functions as a link between a radio frequency or wireless network and a wired or power line network, includes a housing 12. The housing has a power input side 14 from which extends a power plug 16 that can be plugged into any standard residential power outlet. It will be appreciated that the plug configuration can be adapted to any number of international standards to receive line power. Opposite the power input side 14 is a user input side 18. The housing 12 includes a light 20 on the input side that illuminates when plugged into a power receptacle. It will be appreciated that the light may be light sensitive such that if ambient light in the room is minimal, then the light is illuminated. Or, the light may illuminate any time that the device is connected to the line power.

A user interface 24 is provided on the input side 18. Generally, the user interface allows for the adding and deleting of components or nodes to the network. As used herein, the term node refers to any device, wired or wireless, that is connected to the network, or that receives and sends control signals to other devices on the network. In other words, radio frequency (RF) or other wireless-type network devices on a wireless network can be learned to the bridge which then allows for wireless devices to communicate with devices connected to a wired network. In a similar manner, power line (PL) devices on a wired network can be taught to the bridge device so as to communicate with the radio frequency or wireless devices that are associated with the bridge.

The user interface 24 includes a house selector switch 26 that may provide any number of designations. A unit code selector switch 28 is also provided and also provides any number of designations. In selecting a house code and a unit code, the user rotates each switch to designate an identifying code for each node device to be associated with the network and the bridge. The house code selector switch 26 may be associated with alphabetic designations and the unit code selector switch may be associated with numeric designations. This allows for clear designation of a node when added or deleted from the network. In this way, the end user or programmer can keep a chart of house codes and unit codes that are available for use and which house/unit code is associated with a particular node. Although the device shown on the drawing utilizes manual-type switches, it will be appreciated that liquid crystal displays, touch screens or other display media may be used to indicate what settings are used for each switch 26 and 28.

The user interface 24 also includes a plurality of switches or buttons that allow for adding and removing various nodes. The interface includes an "add RF node" button 30, an "add PL node" button 32, a "remove RF node" button 34, and a "remove PL node" button 36. As indicated by their description, the buttons 30-36 allow for addition and removal of RF and PL devices to the bridge 10. A check code button 38 may also be provided on the user interface 24 to determine whether the house/unit code selected on switches 26 and 28 is designated or available for use. As will be described in further detail, the user selects the codes on switches 26 and 28 and by first actuating the check code button 38 can determine by response of a multi-color LED 40 as to whether that particular house/unit code is available for use or not. Accordingly, after the check code button 38 is actuated, a green flashing response of LED 40 may indicate that the house/unit code is available. But, if a red flashing response is provided by the LED 40, then it can be presumed that the house/unit code selected is not available. The LED 40 may also be used to provide other indications as to the operational status of the bridge device or any of the nodes associated with the network. The LED 40 may in fact be several LEDs positioned adjacent one another to generate a color that is associated with the status of the bridge. Other display devices such as LCDs or audio speakers could be used to indicate availability of the selected code.

Figure 2:
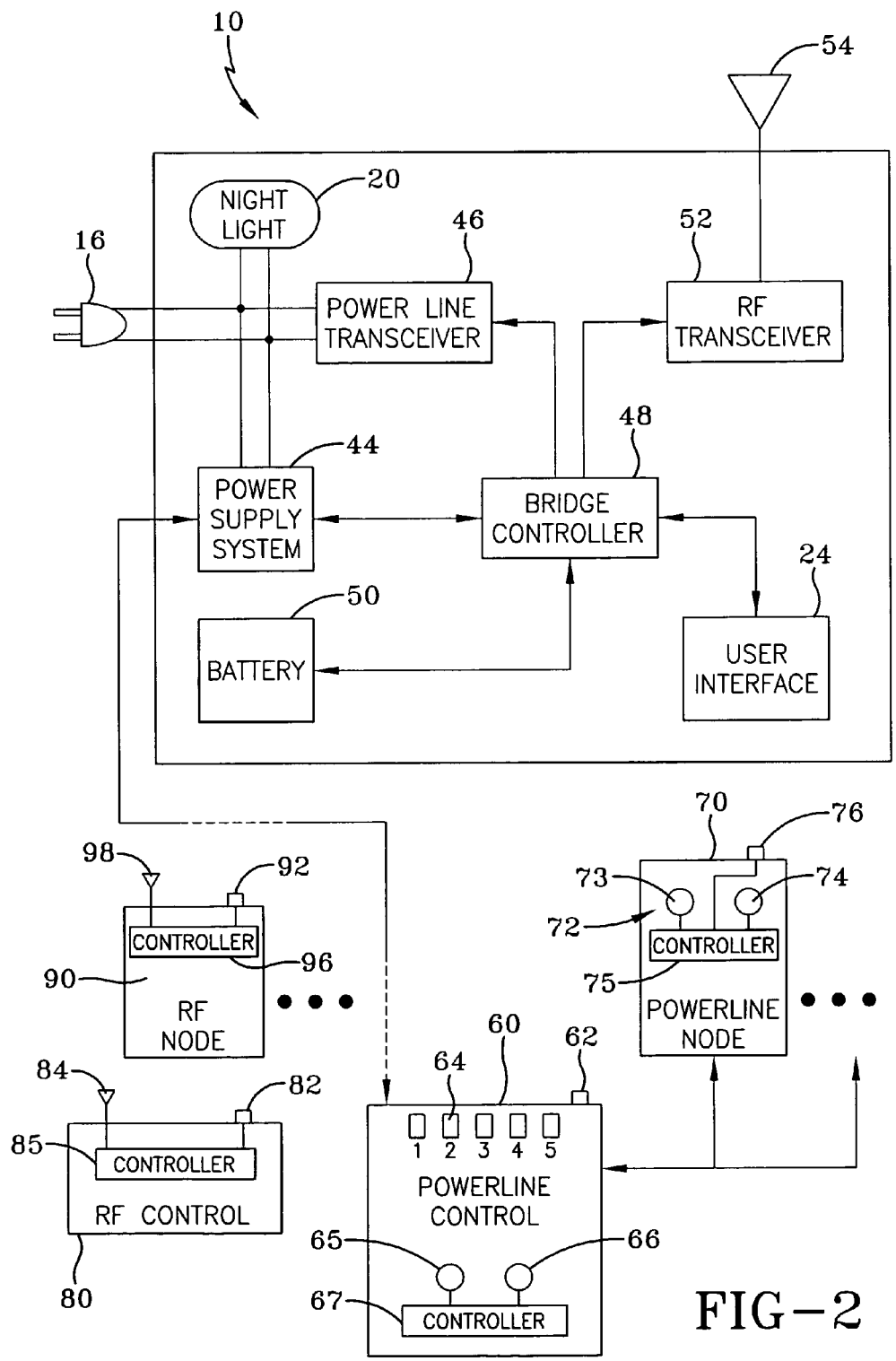
FIG. 2 is a schematic diagram of the bridge device incorporated into a home network system.

Referring now to FIG. 2, the internal components of the bridge 10 are shown and described. In particular, the bridge 10 includes a power supply system 44 that regulates the input power received by the plug 16. It will be appreciated that the power supply system 44 transforms, or steps up or steps down the line power received by the plug 16 so as to enable the components contained within the bridge device. The line power is typically 110 V AC, but of course other types of line power could be used. Also connected to the power supply system 44 and the plug 16 is a power line transceiver 46. The transceiver 46 receives and sends power line control signals to other components or nodes on the power line network. All of these components or nodes are typically contained within a single house or facility. The use of an isolation device at the fuse box or main input of the line power may be used to ensure that stray signals from other power line components in adjacent facilities do not interfere with the operation of the network in the facility in which the bridge device is installed.

A bridge controller 48 is connected to the transceiver 46. The controller 48 is also connected to the power supply system 44. The controller includes a processor that provides the necessary hardware, software and memory to implement the learning of nodes to the bridge device and for the transformation of the signals between the power line devices and the radio frequency devices, and for communications with any other control devices linked to the network.

A battery 50 is connected to the bridge controller 48 and is primarily used when the line power 16 is not connected to the power supply system 44. The battery allows for the bridge device to be moved about a facility for the purpose of learning radio frequency devices. It will also be appreciated that the battery 50 allows for use of at least the radio frequency devices in the event power is not provided to the controller 48. Although any size battery can be used, it is believed that relatively low voltage standard coin cell batteries can be used.

An RF transceiver 52 and an associated antenna 54 are connected to the bridge controller 48 so as to allow the receiving and sending of radio frequency or other wireless signals to the bridge device. The transceiver 52 ideally receives and sends frequency signals in the range of about 900 MHz. Of course, other frequencies could be used. Also connected to the bridge controller 48 are the components associated with the user interface 24.

The controller 48 allows for the bridge device to be either a primary control device or a secondary control device in a home network system. In other words, the bridge controller may be solely used to network devices associated with the home wiring system, or the bridge controller may be solely used to provide control of all the RF devices associated with a network. Ideally, the controller 48 is used to coordinate activity between both a power line network and a radio frequency network so as to take advantage of home wiring network devices and any other radio frequency network devices that can be incorporated into the network to further enhance the use of both types of networks.

The bridge device 10 may be incorporated into a home network system that includes either or both a power line control device 60 and an RF control device 80. The control device 60, which is also a processor-based device that includes the necessary hardware, software and memory for incorporation into the network, includes a learn button 62 and at least one PL switch 64. The PL switch 65 may be used to directly control one or more of the PL nodes or the RF nodes. A house code selector switch 65 and a unit code selector switch 66 may also be incorporated into the power line control device 60. The power line control device 60 also includes a controller 67 with the necessary hardware, software and memory. The controller 67 is connected to the learn button 62, the PL switches 64, and the selector switches 65 and 66. The control device 60 may be used solely to coordinate activity of the power line nodes which are designated generally by the numeral 70. Each node 70 may include a node interface 72 that includes a house selector switch 73 and a unit selector switch 74. These switches are desirably in the same format as the house selector switch and unit selector switch provided on the user interface 24. The node 70 also includes a processor-based controller device 75 that includes the necessary hardware, software and memory for incorporation of the nodes into the home network system. A learn button 76 may also be connected to the controller 75.

The RF primary control device 80 is a wireless system that also includes a learn button 82 and an appropriate controller 85 so as to allow for receipt and transmission of the radio frequency signals via an antenna 84 designated for use with the bridge device 10. And the RF control device 80 may be associated with any number of RF nodes 90, each of which includes a learn button 92 and a user interface 96. These signals are communicated from the RF node via an antenna 98 to allow for communications between the RF node and other RF devices, including the bridge controller 48, as needed. Accordingly, the RF node or the power line node may communicate directly with the bridge controller 48 upon the learning thereof or the nodes may communicate with their respective control devices which in turn communicate directly with the bridge controller 48.

Figure 3:
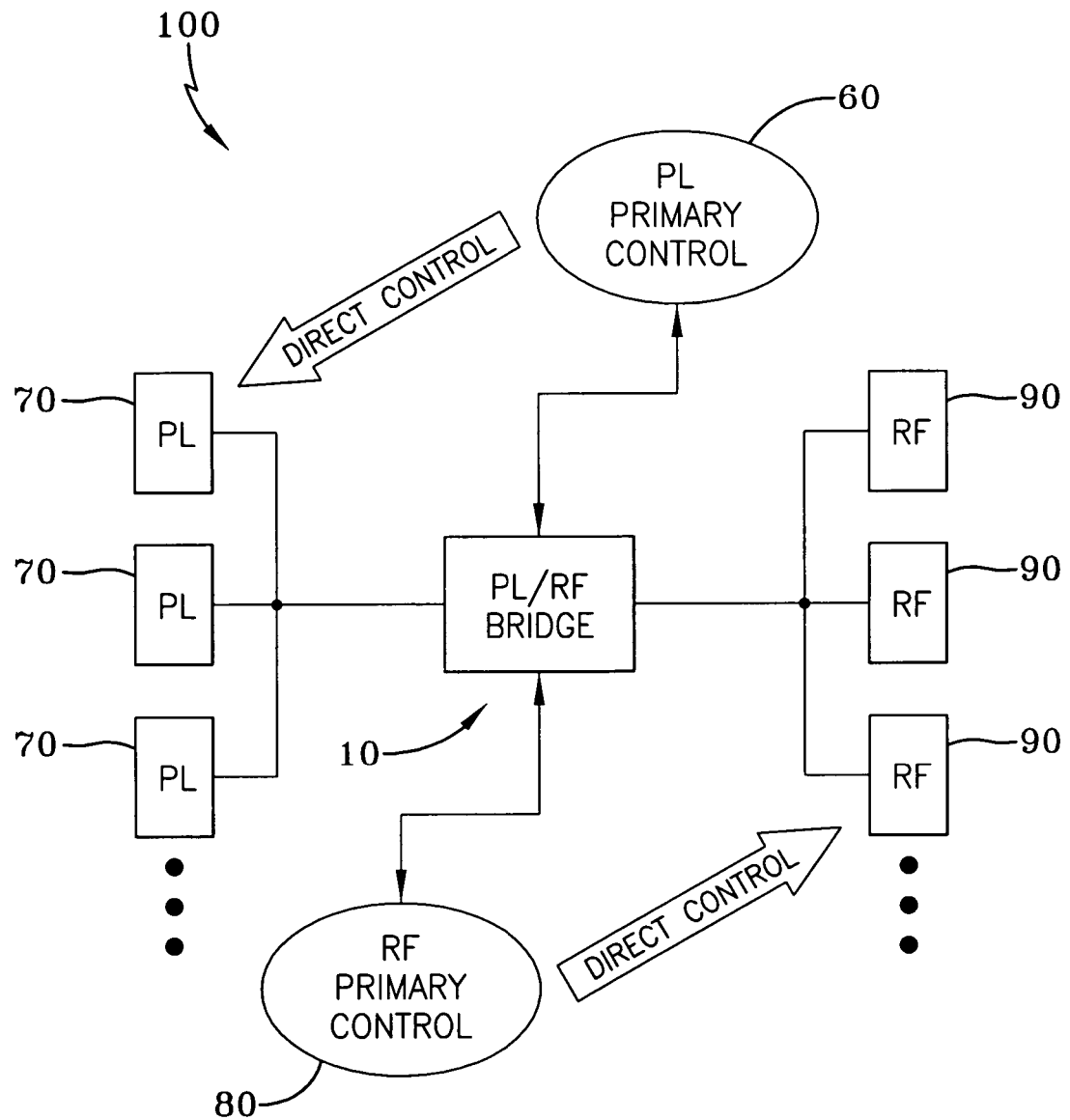
FIG. 3 is a schematic diagram of a home network system incorporating the bridge device.
Figure 4A:
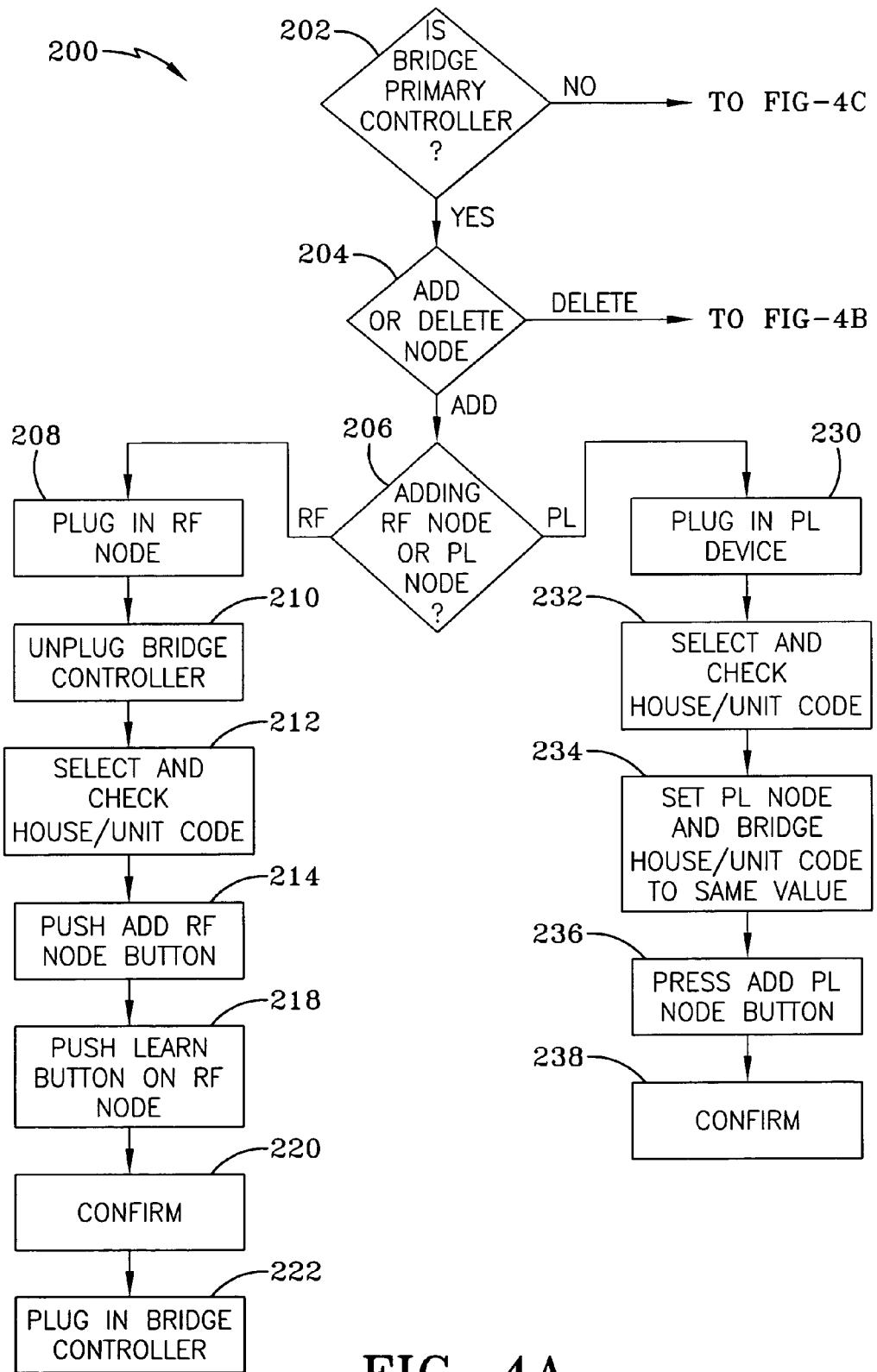
FIGS. 4A-E present an operational flow chart illustrating the steps implemented to add and delete radio frequency and power line nodes to the bridge device.
Figure 4B:
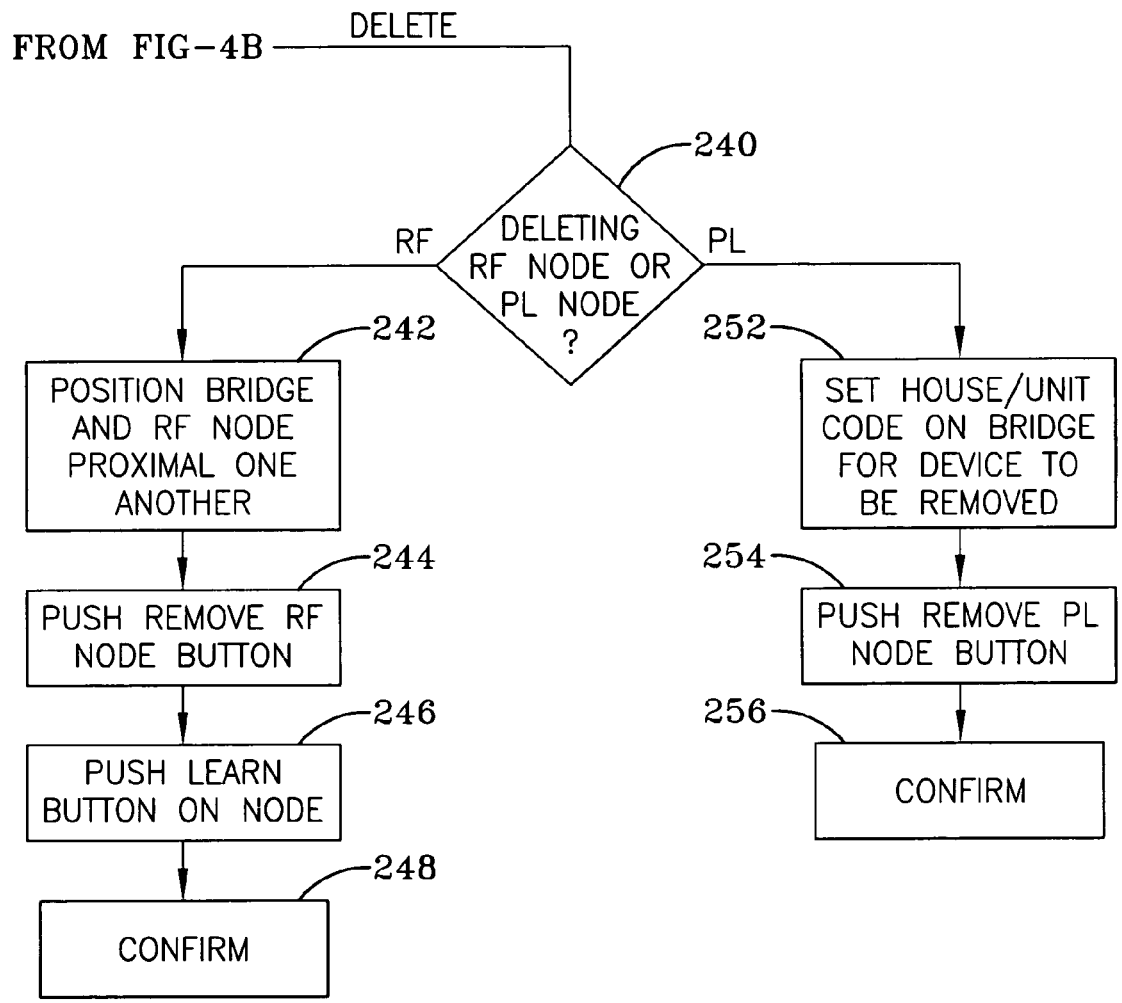
Figure 4C:
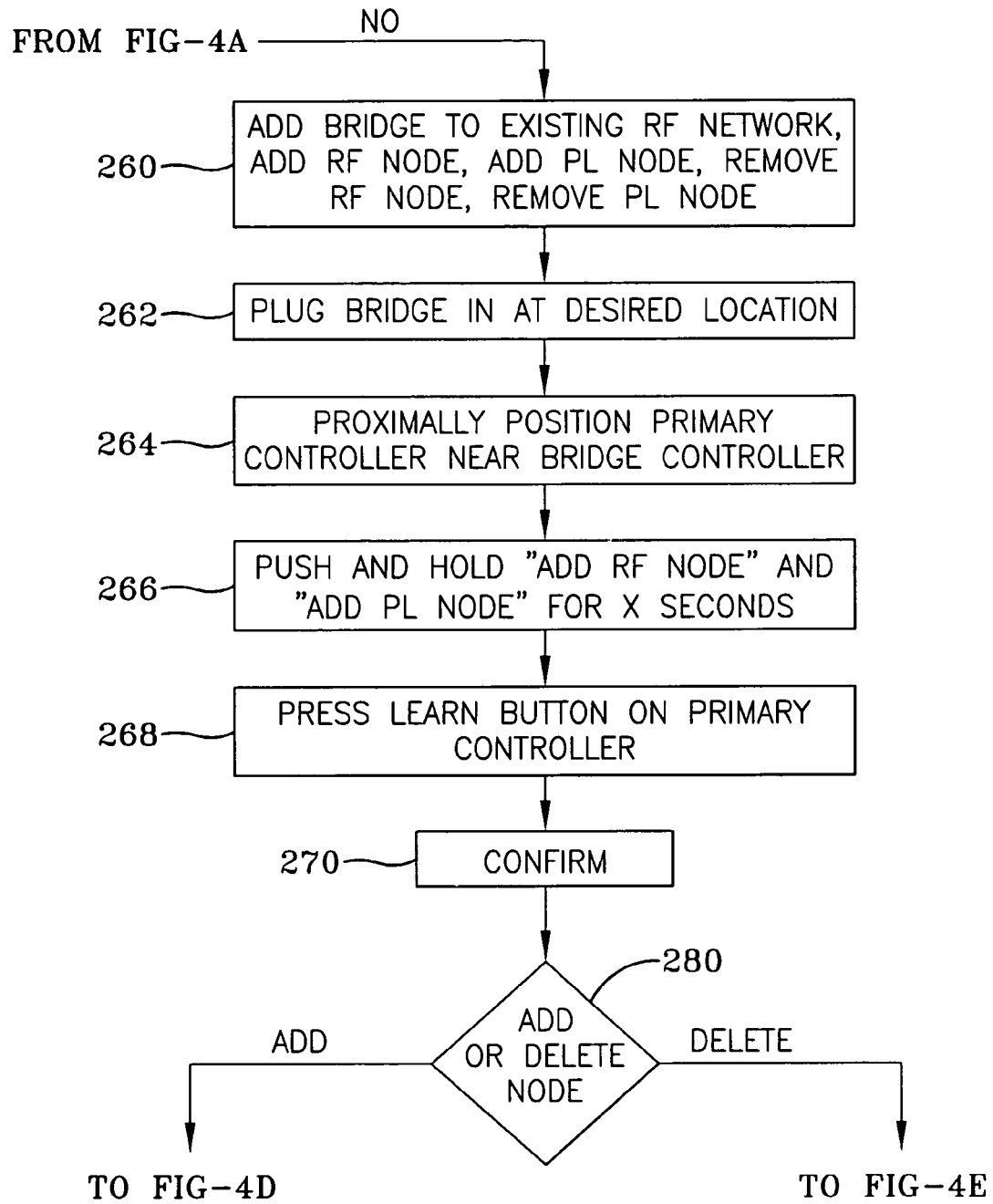
Figure 4D:
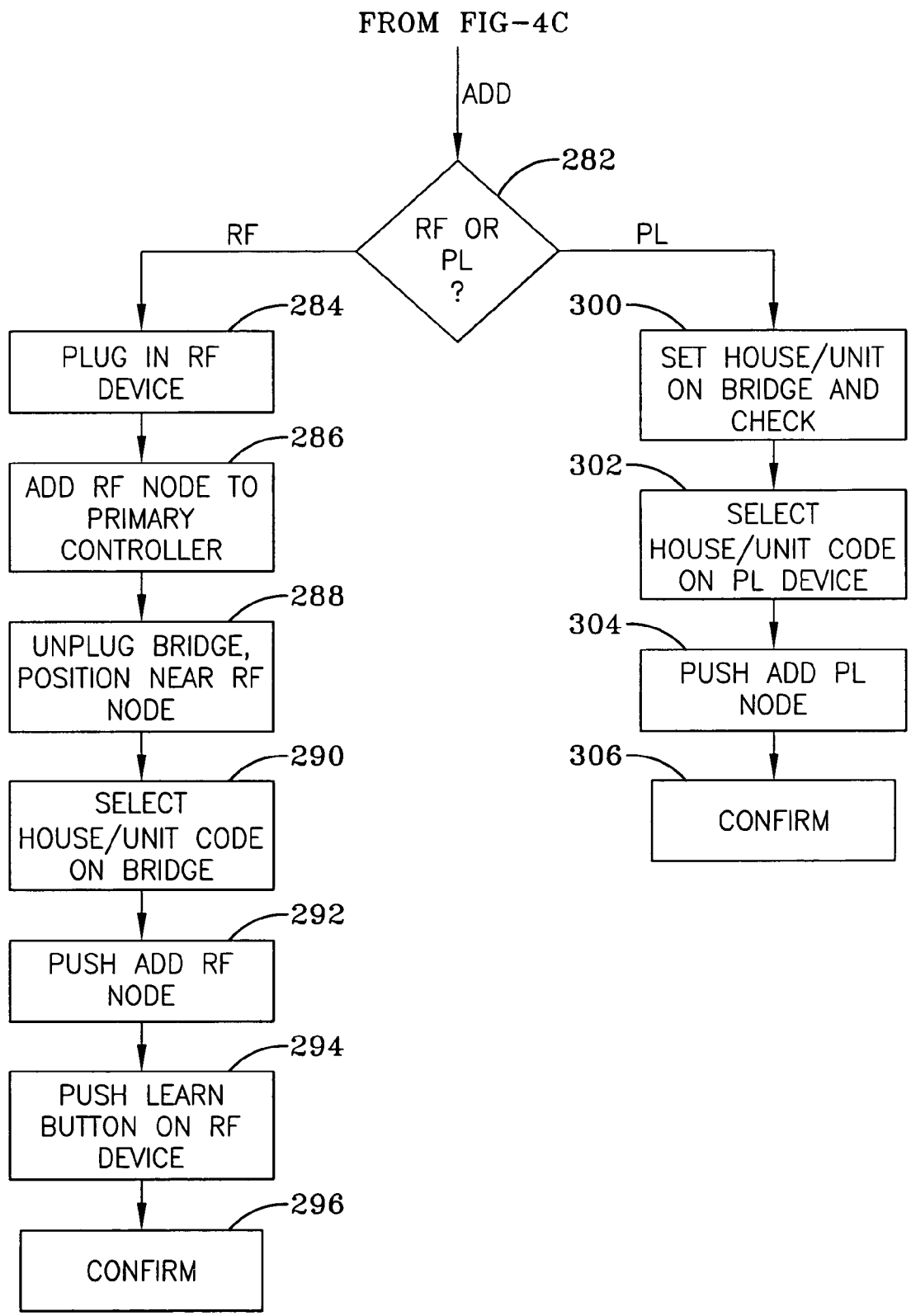
Figure 4E:
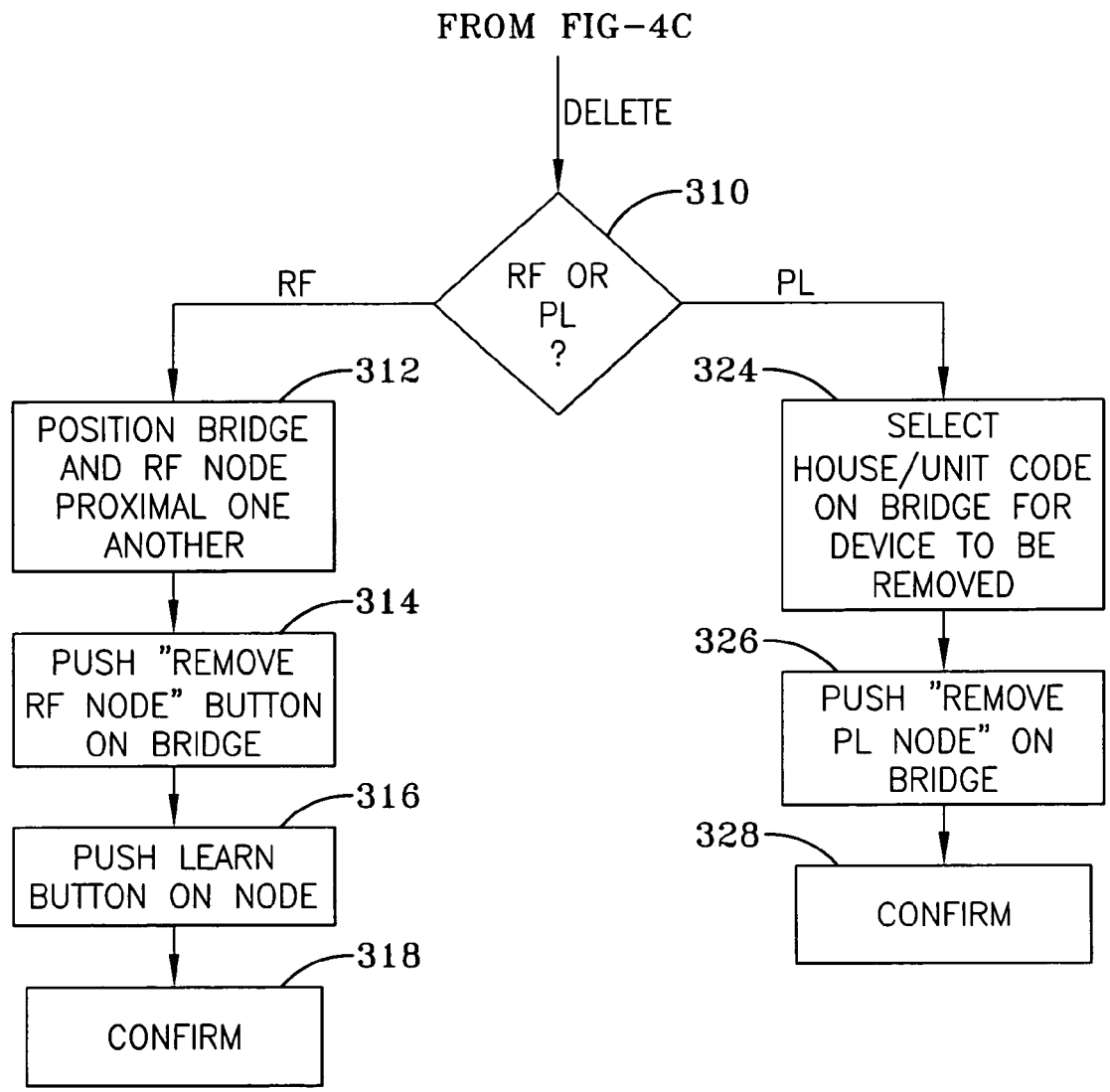

An exemplary network configuration is designated generally by the numeral 100 and best seen in FIG. 3. In the network 100, the bridge device 10 is linked with the PL primary control device 60 and the RF primary control device 80. The PL primary control device may provide direct control over the various PL nodes 70 and the RF primary control device 80 may provide direct control over the RF nodes 90. Each control device 60 and 80 is adapted to be connected to the bridge device 10 so as to allow for indirect control of the PL nodes 70 by the RF primary control device 80, or, in the alternative, the PL primary control device 80 may provide indirect control of the radio frequency nodes 90. The network system, with use of the bridge 10, allows for communication between both power line networks and radio frequency networks. The bridge device has the ability to bridge between the power line network and the radio frequency network. In other words, the bridge controller allows for the translation of like commands from one network to the other. Moreover, the bridging further includes the interpretation of commands from one network to the other in the manner that the other network understands. This transparent bridging is accomplished by a virtual abstraction of one network onto the other. For example, the power line network devices can access radio frequency network devices by the creation of a virtual power line device that the bridge controller recognizes on the power line network. Conversely, radio frequency networked devices can access power line networked devices by the creation of virtual radio frequency devices that the bridge controller recognizes on the radio frequency network. Accordingly, the bridge 10 has the ability to communicate on both power line and radio frequency networks and is also capable of locally controlling network devices on either network via the user interface.

As shown and described, the interface 24 can be as simple as a series of buttons or lights, or it will be appreciated that the user interface could be in the form of a touch screen with a graphical display along with voice recognition and synthesis. The bridge 10 can initiate communications on either network, or on its own network by pre-programmed instructions that can be triggered by timers that are incorporated into the controller 48. Other triggering mechanisms, which may be considered as wired or wireless input nodes, for the controller 48 can be accommodated as well. These triggers include such things as contact closures, light sensitive sensors, sound sensitive sensors, proximity sensors, radar sensors, laser sensors, pressure sensors, moisture sensors, temperature, gas and other types of sensors that can effect communication on either the power line network, the radio frequency network, or both simultaneously. For example, if moisture sensors are associated with the network, detection of rain outside a facility can cause an RF moisture sensor to send a signal to the controller or the bridge device 48 which in turn is programmed to close all automated power line network windows so as to prevent rain from entering the facility. Thus, any type of sensor that is connectable to either the power line network or the power system of the facility or which incorporates radio frequency sending and receiving components can be incorporated into the home network.

Referring now to FIGS. 4A-E, an operational flow chart, designated generally by the numeral 200, is shown that provides for adding and deleting of various node devices, including the primary control devices, to the bridge device 10. Initially, the controller 48 determines whether it has been designated as a primary or as a secondary control device. As indicated previously, the user interface 24 includes two selector switches that are in the form of most other power line devices. The selector switches 26 and 28 do not set the power line address of the bridge itself, which has no address. Instead, these selector switches are used to either learn the addresses of existing power line devices or set the addresses of radio frequency network devices or nodes. The learning or setting of the addresses of the different types of nodes is accomplished by the use of the add buttons 30 and 32. In particular, the adding of a PL node is used to add a power line device to an RF network. The add RF network node is used to either add a new RF network device to the network (if the bridge is the primary control) or assign a power line address to an existing RF network device. The remove buttons 34 and 36 are used to remove RF network nodes or power line nodes from the bridge and a primary control if used. As noted previously, the check code button is used to see if a particular house/unit code is available for assignment to any new device. This is done by setting the selector switches 26 and 28 to a desired code and then the user pushes and holds the check code button. If the selected code is unused, the LED 40 will turn green. If the code is already assigned to a device, the LED 40 will blink red. Of course, other color combinations, audio or visual responses could be emitted by the bridge controller to indicate availability of a code.

Typical primary control devices include user interfaces which allow for the setup of the network components and the relationship between events and scenes. Primary controls are also unique to the network as they are the only control devices capable of including new devices into the network. Primary and secondary controls may contain the node routing information as in the case of mesh type networks. They also include a memory map of all devices assigned to the network. Secondary control devices, by default, may contain many of the same functions as a primary control; however, they are not capable of adding new devices onto the network. If no other RF network control is associated with the entire network system, the bridge 10 is utilized as the primary control. In this particular mode, the bridge 10 has very limited functionality as a primary control inasmuch as it cannot control lights directly, set-up scenes or the like. Accordingly, the bridge is only used as a primary control if one plans on controlling the network through an existing power line control device 60. In this case, the power line control device is not part of the RF portion of the network and therefore it cannot serve as a primary control on that network and thus the bridge 10 ignores the device as a primary control. However, the bridge controller 48, upon detecting the presence of another primary control within the RF portion of the network, automatically re-configures itself as a secondary control. If the bridge is taught to an existing primary control device, the bridge will configure itself as a secondary control device. If other nodes are taught to the bridge 10 and the bridge has not been added to an existing primary control, the bridge will configure itself as a primary control device. If the bridge 10 is initially set to be a primary control device and then later added to a new device that is a primary control device, the set up information for devices associated with the bridge remain intact. This is done by teaching the bridge to the new primary control device which in turn configures itself as a secondary control device and the bridge will automatically transfer its information over to the primary control device.

In order to program the various RF and PL devices to the bridge it may be necessary for the bridge to be held next to the other RF devices. As such, the bridge is unplugged from the power supply 16 and the battery 50 is utilized by the controller 48. In the event the bridge is not plugged into a residential power supply, the controller 48 automatically goes into a sleep mode and pushing any one of the user interface buttons will wake up the bridge controller 48 and other associated components for incorporating or implementing the programming steps.

Referring now to the details of FIG. 4, the controller 48 first determines, at step 202, whether it is a primary control device or a secondary control device. If the controller 48 determines that no other control device is associated with the network, then it will assume the role of a primary control device and proceed to step 204 to allow for the addition or deletion of a node. In the event one of the add buttons 30 or 32 is actuated, the process proceeds to 206 to determine what type of node is being added. If an RF node is being added, then the process proceeds to step 208 and the new RF network device or node is plugged into the location by the user where it will be located in the network. Next, at step 210, the bridge device 10 is unplugged from the wired network and brought into close proximity with the new RF network device. At step 212, the user selects a house and unit code on the user interface and confirms that that particular code is available. At this time, the user will actuate the add RF node button 30 and the LED 40 blinks a green color. Next, at step 218, the learn button 92 on the RF node device 90 is actuated and if the device is successfully learned to the bridge, the LED 40 will illuminate to a solid green color. If there is some type of error in this learning process, then the LED will blink red. It is recommended at this time that the user note the house/unit code assigned to the RF node on a worksheet. At step 222, the user plugs the bridge 10 in any wired outlet in the facility. If desired, a power line control device 60 can be added to the network system so as to control the RF network node that was learned to the controller 48. This is done by simply designating the house/unit code associated with the RF node in steps 212 and 214 to the power line control device 60. In this case the user simply sets the house/unit code to match the same house/unit code on the power line control device 60. Whenever a command such as "turn on" is generated by the power line control device 60 the bridge controller 48 translates the power line signal to the RF format which will be recognized by the RF node device 90.

Returning to step 206, if it is desired to add a power line node, then steps 230-238 are implemented. In particular, it will be appreciated that there is no need to move the bridge controller 48 from the outlet since the bridge 10 is directly connected to the wiring of the facility. In any event, at step 230, the user plugs in the PL device at its desired location in the facility. Next, at step 232, the user selects the house/unit code to be assigned to the PL device on the bridge 10. Of course, the code selected can be checked by utilizing the check code button 38. At step 234, the user will set the power line and the bridge device house/unit codes to the same code and then press the add PL node button 32 at step 236. The LED 40 on the bridge 10 will glow green if the device has been successfully added or it will blink red if there is some type of error at step 238.

It will be appreciated that in the steps 230-238 that if the bridge 10 is acting as a primary control device, then there is a need for a power line control device to operate the system. Accordingly, the only need to add power line devices to the bridge is if RF network devices, (such as an access control system) will be sending commands to power line nodes.

Returning now to step 204, if it is determined that a node is being deleted, then the process continues to step 240. At step 240, the bridge controller determines whether the user is deleting an RF node or a power line node. In order to remove a RF node, the user will need to move the bridge 10 near the RF device to be removed. Or, in the alternative, one can take the RF device, if self-powered, near the bridge. In any event, at step 244, the user actuates the remove RF node button 34 on the bridge and the LED blinks green. At step 246, the user actuates the learn button 92 and at step 248, the LED 40 glows green if the device is successfully removed or the LED blinks red if there is an error.

If a PL device or node is being deleted from the network, then at step 252 the house and user codes on both the bridge device and the PL device to be removed are switched to the same code. Next, at step 254, the remove PL node button 36 is actuated on the bridge 10. At step 256, the removal is either confirmed or not by having the LED 40 glow green if the device is successfully removed, or blink red if there is an error.

If it is determined at step 202 that the bridge 10 is not the primary control device, then at step 260 it will be presumed that the bridge is being added to an existing RF network so as to allow the addition of an RF node, a PL node, or the removal of an RF node or PL node. Accordingly, this is done by plugging the bridge 10 into a power outlet at a desired location within the facility at step 262 and then proximally positioning the primary control, whether it is an RF or PL control device, near the bridge device 10 at step 264. At step 266, the user actuates and holds both the "add RF node" and "add PL node" buttons for a predetermined period of time such as 3 seconds. When this is done, the LED 40 blinks a yellow color, and at step 268, the user actuates the appropriate learn button on the primary control device. At step 270, if the bridge is successfully associated to the network control device, the LED 40 emits a solid green color. If there is some type of an error, the LED blinks red. Upon completion of these steps 260-270, the bridge is now a secondary control device on the RF network and the user can add nodes or delete them.

At step 280, the controller 48 determines whether a node is being deleted or added. If a node is to be added, then at step 282, the controller 48 determines whether an RF or PL node is being added. If an RF node is being added, then at step 284 the user plugs in the new RF network device in a desired position. Next, at step 286, the user adds the RF network device to the network using the primary RF control device in a manner dictated by the primary control device instructions. Next, at step 288, the user unplugs the bridge and places it in close proximity to the new RF network device. The user at step 290 selects the house/unit codes with the desired code for the new device and, if necessary, utilizes the check procedure. At step 292, the add RF node button is actuated on the bridge and the LED blinks a green color. Next, at step 294, the user actuates the learn button on the RF device and at step 296, confirmation on whether the device has been added or not is provided. As in the previous embodiments, if the device is successfully learned, the LED glows a solid green and if there is an error, it blinks red. It is recommended at this time that the user designate the power line code that was assigned to the RF device on a worksheet. By implementing steps 284 through 296 it will be appreciated that a power line control device can control RF network devices that are added to the network. This is done by utilizing the house/unit code that was selected in step 290 and associating it with a specific RF device. In the case of a primary control device, RF devices will respond to commands directly.

At step 282, if a power line device is to be added, then steps 300-306 are implemented. In particular, it will be appreciated that there is no need to move the bridge 10 when adding a power line device to the network. At step 300, a house/unit code is selected and assigned to the new power line device and this house/unit code is checked utilizing the check button 30. If the availability of the code is confirmed, then the power line device and the bridge device are set to the same house/unit codes. At this time, the add PL node button 32 is actuated on the bridge at step 304. At step 306, the successful learning of the device is confirmed by the LED 40 emitting a green color if the device has been successfully added, or blinking red if there is some type of error, such as if the code has already been designated to a device.

Returning now to step 280, if it is determined that a node is to be deleted, then at step 310, the bridge controller inquires as to whether it is an RF node or a PL node. If an RF device is to be deleted, then the user should follow the instructions for the primary controller. It should be appreciated that the bridge needs to remove the RF network node from the internal RF network/power line table when it obtains the new nodes listing from the primary control device. In any event, at step 312, the bridge is positioned near the RF node and then at step 314, the remove RF node button 34 is actuated on the bridge. Next, the learn button on the RF node is actuated at step 316. Removal of the RF node is then confirmed via the LED 40 at step 318.

If at step 310 a PL node is desired to be removed, then the house/unit codes on the bridge and the node are set to the same value at step 324. Next the remove PL node button 36 is actuated at step 326 and then confirmed at step 328.

Based upon the adding and learning of the various nodes and control devices to the network, it will be appreciated that the bridge acts as an intermediary between the power line devices and RF devices. The bridge 10 can work with networks that have either power line control devices or RF control devices that send commands to the networked devices. The bridge monitors the wireless RF commands sent by the RF devices and the power line commands sent by the power line devices and, if necessary, passes the commands to the correct device. Internally, the bridge controller builds up a table of devices that it knows about and looks something like this:

| RF NODE ID | POWER LINE ADDRESS | TYPE |
|---|---|---|
| 1 | A2 | RF |
| 2 | A7 | PL |
| 3 | B3 | PL |
| 4 | B8 | RF |

RF = Radio Frequency,
PL = Power Line

In the above example, if the bridge controller sees an RF command sent to node 2, it will translate it into a power line command for device A7 and send it over the power line. If the bridge sees a power line command for device B8, it will translate it into an RF command for node 4. If the device sees a power line command for device B3, it will do nothing as that is a power line device and should see the command on its own. As an example, assume node B8 is a RF light switch node and node B3 is a power line light switch. If an RF primary control device transmits a "turn on all light switch" command then the bridge device does nothing with node B8 since the primary control device and the light switch communicate directly however, the bridge will translate the "turn on all light switch" command and transmit that command to power line node B3. After the commands are executed, the end result is "all lights on" regardless of network. Thus, it can be appreciated that bridge 10 essentially combines both networks into one.

The advantages of the present invention are readily apparent. In particular, it will be appreciated that the bridge utilizes a controller with the ability to abstract cross network node information between a power line network and a radio frequency network. As such, the bridge can translate protocols between the power line network and the radio frequency network and also translate physical data therebetween. Accordingly, the bridge allows for local control of power line network devices and radio frequency devices. The bridge also allows for independent access to single power line networked nodes and single radio frequency networked nodes. And, in the same manner, collective access can be gained to multiple power line networked nodes and multiple radio frequency networked nodes.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A network bridge device linking devices on a wired network to devices on a wireless network, comprising:
    a wireless signal transceiver adapted to send and receive wireless signals to and from at least one wireless node using a first protocol;
    a wired signal transceiver adapted to send and receive wired signals to and from at least one wired node using a second protocol;
    a bridge controller programmed to receive operational signals from said wireless signal transceiver and said wired signal transceiver; convert said operational signals between said first and second protocols and the physical data associated therewith; and send operational signals in said converted protocols to said wired signal transceiver and said wireless signal transceiver so that said bridge controller forms a virtual abstraction of one of the wired network and the wireless network onto the other so that commands generated by one type of node can be passed to a specific node of the other type;
    a power supply system connected to said bridge controller, said power supply system adapted to receive line power for distribution to said bridge controller; and
    a battery connected to said bridge controller, said bridge controller receiving power from said battery as needed when the line power is not connected to said power supply system,
    wherein said wired nodes are plugged into line power, and said bridge controller learns identification codes associated with said wired nodes and only assigns identification codes to said wireless nodes when unplugged from line power and said bridge controller receives, converts and sends said operational signals when connected to line power.

2. The network bridge device according to claim 1, further comprising
    a user interface connected to said bridge controller, said user interface adapted to assign identification codes to said wireless nodes that send and receive signals in said first protocol, and said user interface adapted to learn identifications codes from said wired nodes that send and receive signals in said second protocol.

3. The bridge device according to claim 2, wherein said user interface comprises:
    at least one selector switch connected to said bridge controller, said at least one selector switch having a plurality of designations, wherein each of said plurality of designations corresponds to one of said identification codes.

4. The bridge device according to claim 3 wherein said user interface further comprises:
    a check code switch connected to said bridge controller; and
    a status indicator connected to said controller, said controller determining whether said designation associated with said at least one selector switch is available for association with one of said wireless node and said wired node and indicating such availability via said status indicator.

5. The bridge device according to claim 4, further comprising:
   an add wireless node switch connected to said controller, and
   an add wired node switch connected to said controller, wherein activation of said one of add node switches enables said bridge controller to learn a corresponding one of said wireless node and said wired node, assign one of said identification codes thereto, and confirm such addition via said status indicator.

6. The bridge device according to claim 5, further comprising:
   a remove wireless node switch connected to said controller; and
   a remove wired node switch connected to said controller, wherein actuation of said one of remove node switches enables said bridge controller to delete a corresponding one of said wireless node and said wired node, clears said identification code therefrom and indicates such deletion via said status indicator.

7. The bridge device according to claim 6, wherein simultaneous actuation of said add node switches for a predetermined period of time enables said bridge controller to learn a primary control device, assign one of said identification codes thereto, and confirm such addition via said status indicator.

8. The bridge device according to claim 7, wherein learning of said primary control device initiates a transfer of said identification codes from said bridge controller to said primary control device.

9. The bridge device according to claim 1, further comprising:
   a light connected to said bridge controller.

10. The network bridge device according to claim 1, further comprising either or both of:
   a wired control device associated with said bridge controller to allow for control of said at least one of wireless nodes, and a wireless control device associated with said bridge controller to allow for control of said at least one of wired nodes.

* * * * *